(12) United States Patent
Kuo et al.

(10) Patent No.: US 8,830,420 B2
(45) Date of Patent: Sep. 9, 2014

(54) SUPPORTING MEMBER AND LIQUID CRYSTAL MODULE WITH THE SAME

(71) Applicant: Shenzhen China Star Optoelectronics Technology Co., Ltd., Guangdong (CN)

(72) Inventors: Yi-cheng Kuo, Shenzhen (CN); Shih Hsiang Chen, Shenzhen (CN); Gang Yu, Shenzhen (CN); Gege Zhou, Shenzhen (CN); Jiaqiang Wang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 137 days.

(21) Appl. No.: 13/701,076

(22) PCT Filed: Nov. 27, 2012

(86) PCT No.: PCT/CN2012/085328
§ 371 (c)(1),
(2), (4) Date: Nov. 30, 2012

(87) PCT Pub. No.: WO2014/079075
PCT Pub. Date: May 30, 2014

(65) Prior Publication Data
US 2014/0146270 A1    May 29, 2014

(30) Foreign Application Priority Data

Nov. 23, 2012 (CN) .......................... 2012 1 0480761

(51) Int. Cl.
*G02F 1/1333* (2006.01)
*F16M 13/02* (2006.01)

(52) U.S. Cl.
CPC ........... *G02F 1/1333* (2013.01); *F16M 13/025* (2013.01)
USPC ............................................... 349/58; 349/60

(58) Field of Classification Search
CPC ............ G02F 1/1333; G02F 1/133305; G02F 1/133308; G02F 1/133608; G02F 1/13452; G02F 1/133615; G02F 2001/133317; G02F 2001/133311; G02F 2201/503; G02F 2201/465
USPC ..................................................... 349/58, 60
See application file for complete search history.

(56) References Cited

U.S. PATENT DOCUMENTS

| 6,067,133 A | * | 5/2000 | Niibori et al. | 349/60 |
| 8,582,050 B2 | * | 11/2013 | Li et al. | 349/58 |
| 2013/0258232 A1 | * | 10/2013 | Zhou | 349/58 |

* cited by examiner

*Primary Examiner* — Mike Qi
(74) *Attorney, Agent, or Firm* — Andrew C. Cheng

(57) ABSTRACT

A supporting member and a liquid crystal module with the same are disclosed. The supporting member includes a first sub-supporting member for supporting a liquid crystal panel, and a second sub-supporting member for abutting against a light guiding plate and an optical film on the light guiding plate. The second sub-supporting member is arranged on the first sub-supporting member. A hardness of the first sub-supporting member is higher than the hardness of the second sub-supporting member. With the structure, the safety of the liquid crystal panel under a vibration environment is enhanced, and a tolerance range of the liquid crystal module subjected to the vibrations is guaranteed.

13 Claims, 3 Drawing Sheets

SUPPORTING MEMBER AND LIQUID CRYSTAL MODULE WITH THE SAME

BACKGROUND OF THE INVENTION

1. Field of the Invention

Embodiments of the present disclosure relate to display technology, and more particularly to a supporting member and the liquid crystal module with the same.

2. Discussion of the Related Art

With the technology development, liquid crystal displays are the most popular display devices nowadays. A liquid crystal module of the liquid crystal display includes a back frame, a light guiding plate, an optical film, a liquid crystal panel, and so on. Supporting members made of rubber materials are usually adopted in the back frame for supporting the light guiding plate, the optical film, and the liquid, crystal panel. Though the cost is low and the assembly process is easy for a typical supporting member, the strength for supporting the liquid crystal panel is not enough such that the liquid crystal panel may not be well fixed. Under the circumstance, the chip on film (COF) on the liquid crystal module may be damaged due to vibrations in the assembly or transporting process.

Therefore, there is a need to provide a supporting, member and the liquid crystal module with the same to overcome the above problems.

SUMMARY

The object of the claimed invention is to provide a supporting member and the liquid crystal module with the same. The supporting member enhances the safety of the liquid crystal panel under a vibration environment. In addition, a tolerance range of the liquid crystal module subjected to vibrations is guaranteed.

In one aspect, it supporting member for a liquid crystal module includes: a first sub-supporting member for supporting a liquid crystal panel; a second sub-supporting member for abutting against a light guiding plate and an optical film on the light guiding plate, the second sub-supporting member is arranged on the first sub-supporting member; and wherein a hardness of the first sub-supporting member is higher than the hardness of the second sub-supporting member, the supporting member comprises a T-shaped cross-section, the first sub-supporting member is made of plastic material, and the second sub-supporting member is made of rubber material.

Wherein the first sub-supporting member includes an L-shaped structure formed by a first supporting portion and a second supporting portion, the second sub-supporting member includes an L-shaped structure formed by a third supporting portion and a fourth supporting portion, the first supporting portion and the third supporting portion are arranged adjacent to each other, and the second supporting portion and the fourth supporting portion are arranged adjacent to each other and extend toward opposite directions.

Wherein the first sub-supporting member includes a T-shaped structure formed by a first supporting portion and a second supporting portion, the second sub-supporting member includes an L-shaped structure formed by a third supporting portion and a fourth supporting portion, the first supporting portion is arranged adjacent to the third supporting portion, and the second supporting portion is arranged adjacent to the fourth supporting portion.

In another aspect, a supporting member for a liquid crystal module includes: a first sub-supporting member for supporting a liquid crystal panel; a second sub-supporting member for abutting against a light guiding plate and an optical film on the light guiding plate, the second sub-supporting member is arranged on the first sub-supporting member; and wherein a hardness of the first sub-supporting member is higher than the hardness of the second sub-supporting member.

Wherein the supporting member comprises a T-shaped cross-section.

Wherein the first sub-supporting member includes an L-shaped structure formed by a first supporting portion and a second supporting portion, the second sub-supporting member includes an L-shaped structure formed by a third supporting portion and a fourth supporting portion, the first supporting portion and the third supporting portion are arranged adjacent to each other, and the second supporting portion and the fourth supporting portion are arranged adjacent to each other and extend toward opposite directions.

Wherein the first sub-supporting member includes a T-shaped structure formed by a first supporting portion and a second supporting portion, the second sub-supporting member includes an L-shaped structure formed by a third supporting portion and a fourth supporting portion, the first supporting portion is arranged adjacent to the third supporting portion, and the second supporting portion is arranged adjacent to the fourth supporting portion.

Wherein the first sub-supporting member is made of plastic material, and the second sub-supporting member is made of rubber material.

In another aspect, a liquid crystal module includes: a back frame; a light guiding plate received within the back frame; an optical film arranged on the light, guiding plate; a liquid crystal panel arranged on the optical film; a plurality of supporting members are sectionally arranged in the back frame, the supporting member comprises a first sub-supporting member for supporting a liquid crystal panel and a second sub-supporting member for abutting against the light guiding plate and the optical film, second sub-supporting member is arranged on the first sub-supporting member, and a hardness of the first sub-supporting member is higher than the hardness of the second sub-supporting member.

Wherein the supporting member comprises a T-shaped cross-section.

Wherein the first sub-supporting member includes an L-shaped structure formed by a first supporting portion and a second supporting portion, the second sub-supporting member includes an L-shaped structure formed by a third supporting portion and a fourth supporting portion, the first supporting portion and the third supporting portion are arranged adjacent to each other, the second supporting portion and the fourth supporting portion are arranged adjacent to each other and extend toward opposite directions, the first supporting portion is for supporting the liquid, crystal panel, and the third supporting portion is for abutting against the light guiding plate and the optical film.

Wherein the first sub-supporting member includes a T-shaped structure formed by a first supporting portion and a second supporting portion, the second sub-supporting member includes an L-shaped structure formed by a third supporting portion and a fourth supporting portion, the first supporting portion is arranged adjacent to the third supporting portion, and the second supporting portion is arranged adjacent to the fourth supporting portion, the first supporting portion is for supporting the liquid crystal panel, and the third supporting portion is for abutting against the light guiding plate and the optical film.

Wherein first sub-supporting member is made of plastic material, and the second sub-supporting member is made of rubber material.

DETAILED DESCRIPTION OF THE EMBODIMENTS

Embodiments of the invention will now be described more fully hereinafter with reference to the accompanying drawings, in which embodiments of the invention are shown.

Figure 1:
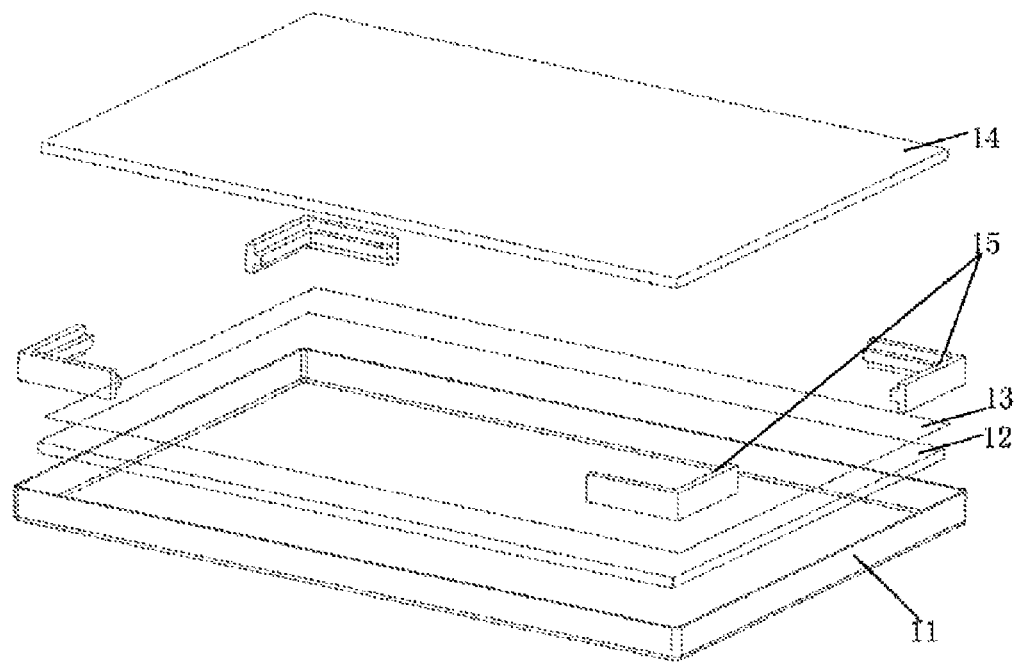
FIG. 1 is an exploded view of the liquid crystal module in accordance with the embodiment.

FIG. 1 is an exploded view of the liquid crystal module in accordance with the embodiment. The liquid crystal module includes a back frame 11, a light guiding plate 12, an optical film 13, a liquid crystal panel 14, and a plurality of supporting members 15.

Figure 2:
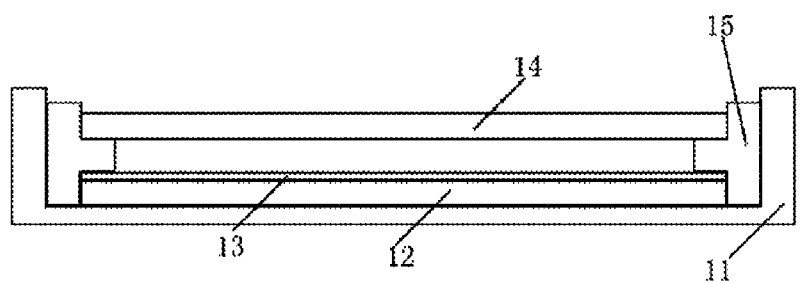
FIG. 2 is a schematic view of the liquid crystal module in accordance with the embodiment.

FIG. 2 is a schematic view of the liquid crystal module in accordance with the embodiment. The light guiding plate 12, the optical film 13, and the liquid crystal panel 1.4 are arranged within the back frame 11. The optical film 13 is arranged on the light, guiding plate 12, and the liquid crystal panel 14 is arranged on the optical film 13. The supporting members 15 are arranged between the optical film 13 and the liquid crystal panel 14. The supporting members 15 are sectionally arranged in the back frame 11. In the embodiment, the back frame 11 is rectangular-shaped, and the supporting members 15 are arranged on four corners of the back frame 11. In other embodiments, the supporting members 15 may be arranged on edges of the back frame 11. The supporting members 15 are for supporting the liquid crystal panel 14 and for elastically abutting against the optical film 13 and the light guiding plate 12.

Figure 3:
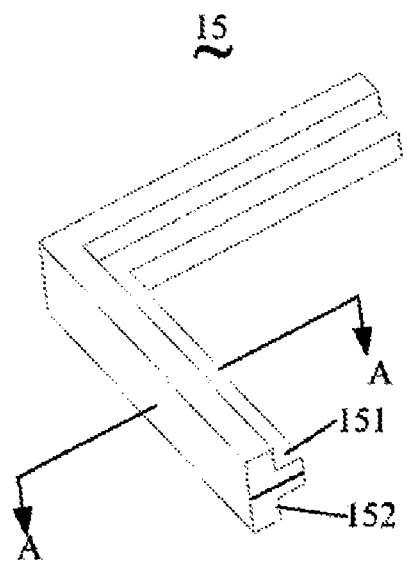
FIG. 3 is a schematic view of the supporting member in accordance with a first embodiment.
Figure 4:
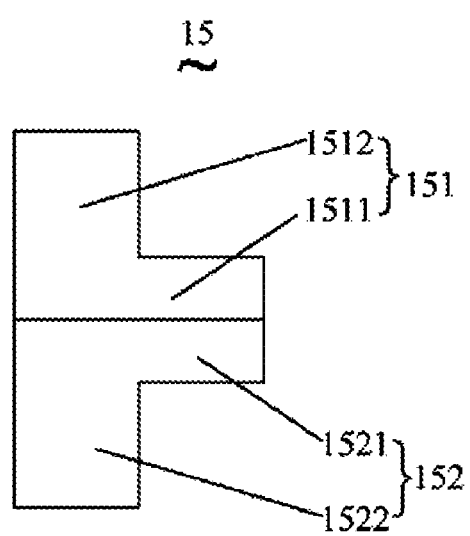
FIG. 4 is a cross sectional view of the supporting member of FIG. 3 along the A-A direction.

FIG. 3 is a schematic view of the supporting member 15 in accordance with a first embodiment. FIG. 4 is a cross sectional view of the supporting member 15 of FIG. 3 along the A-A direction. As shown in FIGS. 3 and 4, each of the supporting members 15 includes a first sub-supporting member 151 and a second sub-supporting member 152. The second sub-supporting member 152 is arranged on the first sub-supporting member 151. A hardness of the first sub-supporting member 151 is higher than the hardness of the second sub-supporting member 152. Specifically, the first sub-supporting member 151 and the second sub-supporting member 152 are integrally arranged. The first sub-supporting member 151 is made of plastic material, and the second sub-supporting member 152 is made of rubber material. In other embodiments, the first sub-supporting member 151 may be made by other material, such as silicon with higher hardness. And the second sub-supporting member 152 may be made by other material, such as silicon with lower hardness.

The first sub-supporting member 151 is for supporting the liquid crystal panel 14. The second sub-supporting member 152 is for elastically abutting against the light guiding plate 12 and the optical film 13.

Furthermore, as shown in FIG. 4, each of the supporting members 15 has a T-shaped cross-section. Specifically, the first sub-supporting member 151 includes an L-shaped structure formed by a first supporting portion 1511 and a second supporting portion 1512. Edges of the first supporting portion 1511 and the second supporting portion 1512 are connected and vertical to each other such that the liquid crystal panel 14 is received by the edges of the first sub-supporting member 151. The second sub-supporting member 152 includes an L-shaped structure formed by a third supporting portion 1521 and a fourth supporting portion 1522. Edges of the third supporting portion 1521 and the fourth supporting portion 1522 are connected and vertical to each other such that edges of the light guiding plate 12 are received in the second sub-supporting member 152. The first supporting portion 1511 and the third supporting portion 1522 are arranged adjacent to each other. The second supporting portion 1512 and the fourth supporting portion 1522 are arranged adjacent to each other and extend toward opposite directions. The first supporting portion 1511 is for supporting the liquid crystal panel 14. The third supporting portion 1521 is for abutting against the light guiding plate 12 and the optical film 13. In other embodiments, the first supporting portion 1511 and the second supporting portion 1512 may not be vertical to each other. Also, the third supporting portion 1521 and the fourth supporting portion 1522 may not be vertical to each other.

Figure 5:
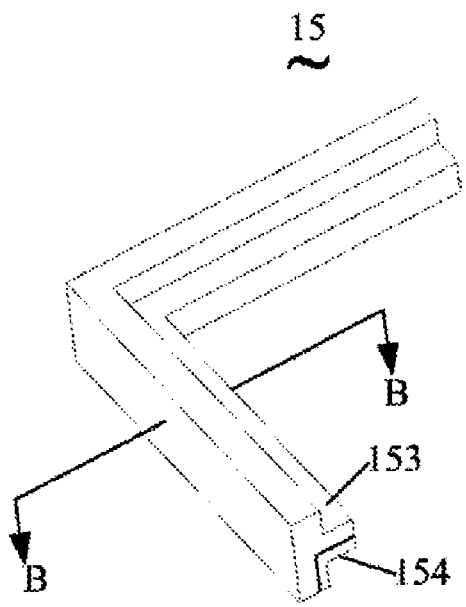
FIG. 5 is a schematic view of the supporting member in accordance with a second embodiment.
Figure 6:
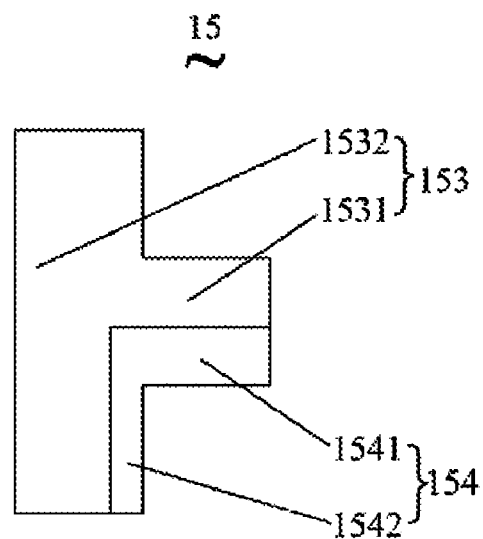
FIG. 6 is a cross sectional view of the supporting member of FIG. 5 along the B-B direction.

FIG. 5 is a schematic view of the supporting member in accordance with a second embodiment. FIG. 6 is a cross sectional view of the supporting member of FIG. 5 along the B-B direction. In the embodiment, the supporting member 15 includes a first sub-supporting member 153 and a second sub-supporting member 154.

The second sub-supporting member 154 is arranged on the first sub-supporting member 153. The hardness of the first sub-supporting member 153 is higher than the hardness of the second sub-supporting member 154. Specifically, the first sub-supporting member 153 and the second sub-supporting member 154 are integrally arranged. The first sub-supporting member 153 is made of plastic material, and the second sub-supporting member 154 is made of rubber material. In other embodiments, the first sub-supporting member 153 may be made by other material, such as silicon with higher hardness. And the second sub-supporting member 154 may be made by other material, such as silicon with lower hardness.

As shown in FIG. 6, the first sub-supporting member 153 includes a T-shaped structure formed by a first supporting portion 1531 and a second supporting portion 1532. One edge of the first supporting portion 1531 connects to a middle portion of the second supporting portion 1532, and the first supporting portion 1531 is vertical to the second supporting portion 1532 such that the edges of the liquid crystal panel 14 may be received in the first sub-supporting member 153. The second sub-supporting member 154 includes an L-shaped structure formed by a third supporting portion 1541 and a fourth supporting portion 1542. Edges of the third supporting portion 1541 and the fourth supporting portion 1542 connects to each other, and the third supporting portion 1541 is vertical to the fourth supporting portion 1542 such that the edges of the light guiding plate 12 may be received in the second sub-supporting member 154. The first supporting portion 1531 is arranged adjacent to the third supporting portion 1541, and the second supporting portion 1532 is arranged adjacent to the fourth supporting portion 1542. The first supporting portion 1531 is for supporting the liquid crystal panel 14, and the third supporting portion 1541 is for abutting against the light guiding plate 12 and the optical film 13. In other embodiments, the first supporting portion 1531 is not vertical to the second supporting portion 1532, and the third supporting portion 1541 is not vertical to the fourth supporting portion 1542.

In view of the above, the first sub-supporting member is for supporting the liquid crystal panel, and the second sub-supporting member is for abutting against the light guiding plate and the optical film. The hardness of the first sub-supporting member is higher than the hardness of the second sub-supporting member. With such structure, the safety of the liquid crystal panel under a vibration environment is enhanced, and a tolerance range of the liquid crystal module subjected to the vibrations is guaranteed.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A supporting member for a liquid crystal module, comprising,
    a first sub-supporting member for supporting a liquid crystal panel;
    a second sub-supporting member for abutting against a light guiding plate and an optical film on the light guiding plate, the second sub-supporting member is arranged on the first sub-supporting member; and
    wherein a hardness of the first sub-supporting member is higher than the hardness of the second sub-supporting member, the supporting member comprises a T-shaped cross-section, the first sub-supporting member is made of plastic material, and the second sub-supporting member is made of rubber material.

2. The supporting member as claimed in claim 1, wherein the first sub-supporting member includes an L-shaped structure formed by a first supporting portion and a second supporting portion, the second sub-supporting member includes an L-shaped structure formed by a third supporting portion and a fourth supporting portion, the first supporting portion and the third supporting portion are arranged adjacent to each other, and the second supporting portion and the fourth supporting portion are arranged adjacent to each other and extend toward opposite directions.

3. The supporting, member as claimed in claim 1, wherein the first sub-supporting member includes a T-shaped structure formed by a first supporting portion and a second supporting portion, the second sub-supporting member includes an L-shaped structure formed by a third supporting portion and a fourth supporting portion, the first supporting portion is arranged adjacent to the third supporting portion, and the second supporting portion is arranged adjacent to the fourth supporting portion.

4. A supporting member for a liquid crystal module, comprising:
    a first sub-supporting member for supporting, a liquid crystal panel;
    a second sub-supporting member for abutting against a light guiding plate and an optical film on the light, guiding plate, the second sub-supporting member is arranged on the first sub-supporting member; and
    wherein a hardness of the first sub-supporting member is higher than the hardness of the second sub-supporting member.

5. The supporting member as claimed in claim 4, wherein the supporting member comprises a T-shaped cross-section.

6. The supporting member as claimed in claim 4, wherein the first sub-supporting member includes an L-shaped structure formed by a first supporting portion and a second supporting portion, the second sub-supporting member includes an L-shaped structure formed by a third supporting portion and a fourth supporting portion, the first supporting portion and the third supporting portion are arranged adjacent to each other, and the second supporting portion and the fourth supporting portion are arranged adjacent to each other and extend toward opposite directions.

7. The supporting member as claimed in claim 4, wherein the first sub-supporting member includes a T-shaped structure formed by a first supporting portion and a second supporting portion, the second sub-supporting member includes an L-shaped structure formed by a third supporting portion and a fourth supporting portion, the first supporting portion is arranged adjacent to the third supporting portion, and the second supporting portion is arranged adjacent to the fourth supporting portion.

8. The supporting member as claimed in claim 4, wherein the first sub-supporting member is made of plastic material, and the second sub-supporting member is made of rubber material.

9. A liquid crystal module, comprising:
    a back frame;
    a light guiding plate received within the back frame;
    an optical film arranged on the light guiding plate;
    a liquid crystal panel arranged on the optical film; and
    a plurality of supporting members are sectionally arranged in the back frame, the supporting member comprises a first sub-supporting member for supporting a liquid crystal panel and a second sub-supporting member for abutting against the light guiding plate and the optical film, second sub-supporting member is arranged on the first sub-supporting member, and a hardness of the first sub-supporting member is higher than the hardness of the second sub-supporting member.

10. The supporting member as claimed in claim 9, wherein the supporting member comprises a T-shaped cross-section.

11. The supporting member as claimed in claim 9, wherein the first sub-supporting member includes an L-shaped structure formed by a first supporting portion and a second supporting portion, the second sub-supporting member includes an L-shaped structure formed by a third supporting portion and a fourth supporting portion, the first supporting portion and the third supporting portion are arranged adjacent to each other, the second supporting portion and the fourth supporting portion are arranged adjacent to each other and extend toward opposite directions, the first supporting portion is for supporting the liquid crystal panel, and the third supporting portion is for abutting against the light guiding plate and the optical film.

12. The supporting member as claimed in claim 9, wherein the first sub-supporting member includes a T-shaped structure formed by a first supporting portion and a second supporting portion, the second sub-supporting member includes an L-shaped structure formed by a third supporting portion and a fourth supporting portion, the first supporting portion is arranged adjacent to the third supporting portion, and the second supporting portion is arranged adjacent to the fourth supporting portion, the first supporting portion is for supporting the liquid crystal panel, and the third supporting portion is for abutting against the light guiding plate and the optical film.

13. The supporting member as claimed in claim 9, wherein first sub-supporting member is made of plastic material, and the second sub-supporting member is made of rubber material.

\* \* \* \* \*